(12) United States Patent
Imagawa et al.

(10) Patent No.: US 11,348,225 B2
(45) Date of Patent: May 31, 2022

(54) INFORMATION PRESENTATION METHODS

(71) Applicant: Panasonic Intellectual Property Management Co., Ltd., Osaka (JP)

(72) Inventors: Taro Imagawa, Osaka (JP); Akihiro Noda, Osaka (JP); Yuki Maruyama, Osaka (JP); Hiroya Kusaka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/123,410

(22) Filed: Dec. 16, 2020

(65) Prior Publication Data

US 2021/0104031 A1 Apr. 8, 2021

Related U.S. Application Data

(63) Continuation of application No. PCT/JP2019/026007, filed on Jul. 1, 2019.

(30) Foreign Application Priority Data

Oct. 29, 2018 (JP) .............................. JP2018-203309

(51) Int. Cl.
*G06T 7/00* (2017.01)
*H04N 5/225* (2006.01)
(Continued)

(52) U.S. Cl.
CPC ........... *G06T 7/001* (2013.01); *H04N 5/2258* (2013.01); *H04N 5/23229* (2013.01); *H04N 9/04* (2013.01);
(Continued)

(58) Field of Classification Search
CPC ........... G06T 7/001; G06T 2207/10024; G06T 2207/30184; G06T 7/00; H04N 5/2258;
(Continued)

(56) References Cited

U.S. PATENT DOCUMENTS

2011/0174881 A1* 7/2011 Samek ............... G06K 7/10821
235/470
2014/0267622 A1* 9/2014 Kasahara ............... G01C 3/085
348/46
(Continued)

FOREIGN PATENT DOCUMENTS

EP 2991340 A2 * 3/2016 ............. H04N 5/335
EP E P-2991340 A2 * 3/2016 ............ H04N 5/2351
(Continued)

OTHER PUBLICATIONS

International Search Report dated Aug. 13, 2019 in International (PCT) Application No. PCT/JP2019/026007.

*Primary Examiner* — Richard A Hansell, Jr.
(74) *Attorney, Agent, or Firm* — Wenderoth, Lind & Ponack, L.L.P.

(57) ABSTRACT

An information presentation method according to the present disclosure includes: acquiring two or more monochrome images obtained by image-capturing a structure using a monochrome camera and one or more first color images obtained by image-capturing the structure using a color camera, the one or more first color images having a less amount of information than an amount of information of the two or more monochrome images; detecting a displacement that indicates a movement of the structure based on the two or more monochrome images; generating presentation information that includes one or more second color images that present information that indicates the displacement based on the two or more monochrome images and the one or more
(Continued)

first color images; and outputting the presentation information.

15 Claims, 8 Drawing Sheets

(51) Int. Cl.
    *H04N 5/232*     (2006.01)
    *H04N 9/04*     (2006.01)

(52) U.S. Cl.
    CPC ............... *G06T 2207/10024* (2013.01); *G06T 2207/30184* (2013.01)

(58) Field of Classification Search
    CPC ...... H04N 5/23229; H04N 9/04; G01B 11/00; G01B 11/16
    See application file for complete search history.

(56) References Cited

U.S. PATENT DOCUMENTS

| | | | |
|---|---|---|---|
| 2015/0320343 A1* | 11/2015 | Utsunomiya | A61B 5/742 600/595 |
| 2015/0324656 A1* | 11/2015 | Marks | G06T 7/20 383/103 |
| 2017/0243366 A1* | 8/2017 | Imagawa | G06T 7/73 |
| 2018/0189556 A1* | 7/2018 | Shamir | G06T 7/269 |
| 2019/0098188 A1* | 3/2019 | Zhu | H04N 5/23245 |
| 2019/0259139 A1* | 8/2019 | Ichihashi | G06T 7/579 |
| 2020/0380636 A1* | 12/2020 | Dawson | G06T 7/32 |
| 2021/0127051 A1* | 4/2021 | Lai | H04N 5/23232 |

FOREIGN PATENT DOCUMENTS

| | | | | |
|---|---|---|---|---|
| EP | 3416369 A1 * | 12/2018 | ........... | H04N 5/2258 |
| JP | 2015-141151 | 8/2015 | | |

\* cited by examiner

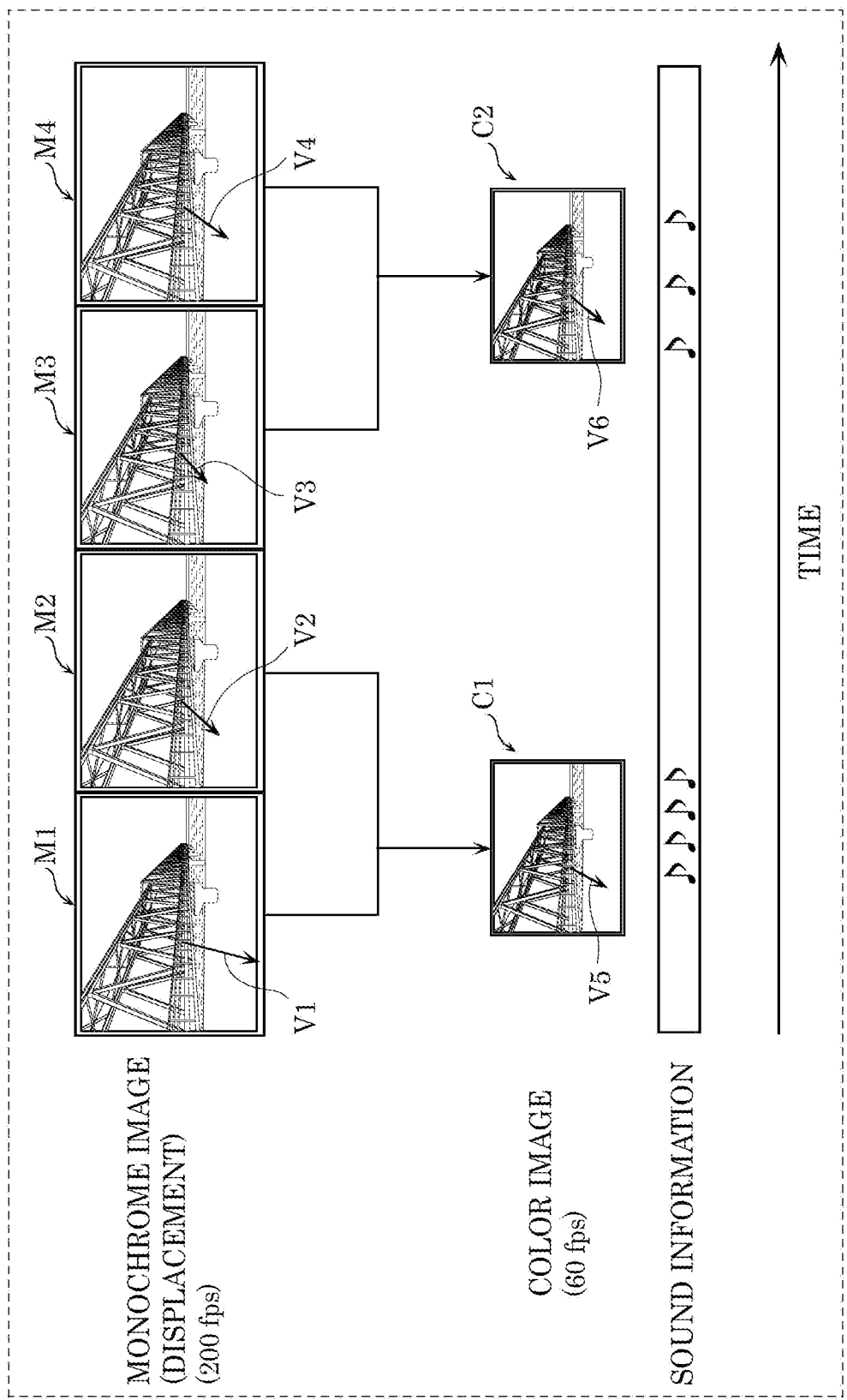

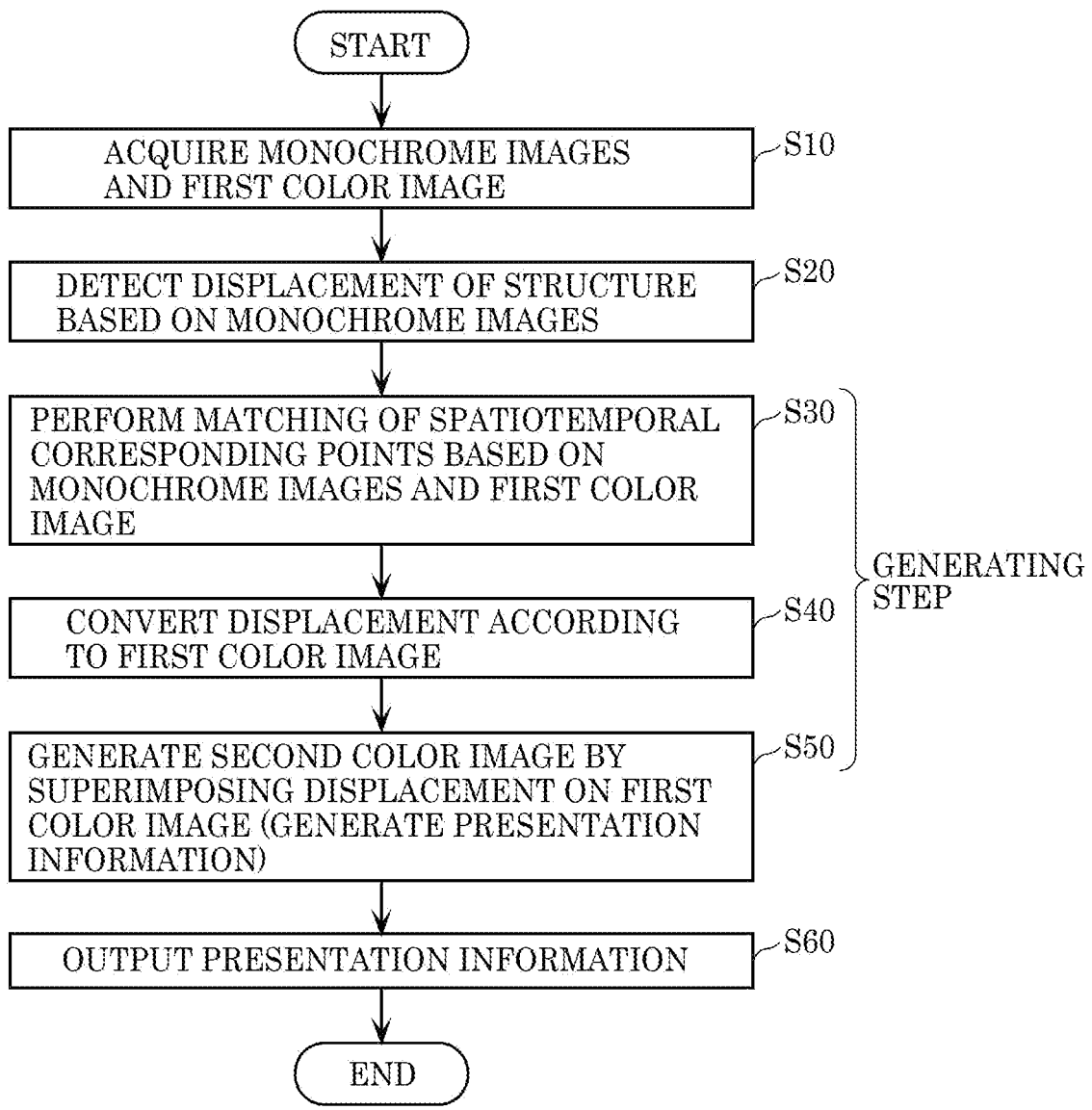

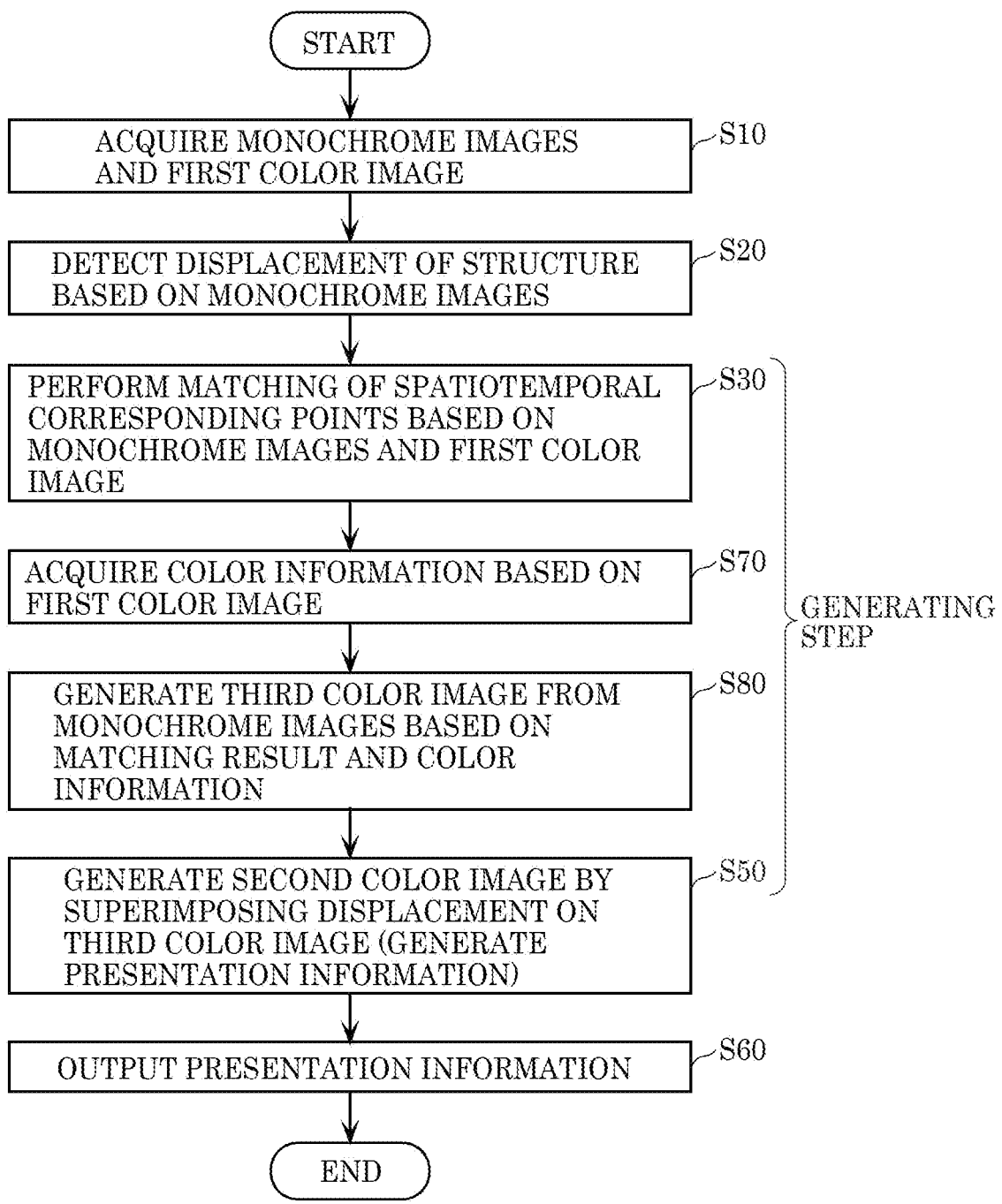

INFORMATION PRESENTATION METHODS

CROSS REFERENCE TO RELATED APPLICATIONS

This application is a U.S. continuation application of PCT International Patent Application Number PCT/JP2019/026007 filed on Jul. 1, 2019, claiming the benefit of priority of Japanese Patent Application Number 2018-203309 filed on Oct. 29, 2018, the entire contents of which are hereby incorporated by reference.

BACKGROUND

1. Technical Field

The present disclosure relates to an information presentation method, an information presentation device, and an information presentation system.

2. Description of the Related Art

Conventionally, for checkup of an infrastructure structure such as a bridge, visual checkup or hammering test is performed on the bridge or the like on a regular basis. However, there are a huge number of check points, and it is therefore difficult for workers to perform checking operations depending on the installation location of the structure, imposing a burden on the workers. For this reason, structure inspection using cameras has been studied.

In the structure inspection using cameras, highly accurate detection of a movement of a bridge or the like is desired. For example, Japanese Unexamined Patent Application Publication No. 2015-141151 (PTL 1) discloses a measurement device that measures a movement of a measurement target by calculating a displacement of a plurality of grid patterns provided on the measurement target.

SUMMARY

A measurement device that performs highly accurate displacement measurement on a structure and presents a measurement result in an easily comprehensible manner is desired. However, with the measurement device disclosed in PTL 1, no consideration is given to presenting a measurement result in an easily comprehensible manner.

In view of the above, it is an object of the present disclosure to provide an information presentation method, an information presentation device, and an information presentation system, with which it is possible to perform highly accurate displacement measurement on a structure and present a measurement result in an easily comprehensible manner.

An information presentation method according to an aspect of the present disclosure includes: acquiring two or more monochrome images obtained by image-capturing a structure using a first image capturing device and one or more first color images obtained by image-capturing the structure using a second image capturing device that is different from the first image capturing device, the one or more first color images having a less amount of information than an amount of information of the two or more monochrome images; detecting a displacement that indicates a movement of the structure based on the two or more monochrome images; generating presentation information that includes one or more second color images that present information that indicates the displacement based on the two or more monochrome images and the one or more first color images; and outputting the presentation information.

An information presentation device according to an aspect of the present disclosure includes: a first acquirer that acquires two or more monochrome images obtained by image-capturing a structure using a first image capturing device; a second acquirer that acquires one or more first color images that are obtained by image-capturing the structure using a second image capturing device that is different from the first image capturing device, the one or more first color images having a less amount of information than an amount of information of the two or more monochrome images; a displacement detector that detects a displacement that indicates a movement of the structure based on the two or more monochrome images; a presentation information generator that generates presentation information that includes one or more second color images that present information that indicates the displacement based on the two or more monochrome images and the one or more first color images; and an outputter that outputs the presentation information.

An information presentation system according to an aspect of the present disclosure includes: the above-described information presentation device; a monochrome camera that captures the two or more monochrome images of the structure and outputs the two or more monochrome images captured to the information presentation device; and a color camera that captures the one or more first color images of the structure and outputs the one or more first color images captured to the information presentation device.

With the information presentation method, the information presentation device, and the information presentation system according to the aspects of the present disclosure, it is possible to perform highly accurate displacement measurement on a structure and present a measurement result in an easily comprehensible manner.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 is a diagram illustrating association between monochrome images and color images according to Embodiment 1;

FIG. 5 is a flowchart illustrating operations performed by the information presentation device according to Embodiment 1;

FIG. 8 is a flowchart illustrating operations performed by an information presentation device according to Embodiment 2.

Figure 1:
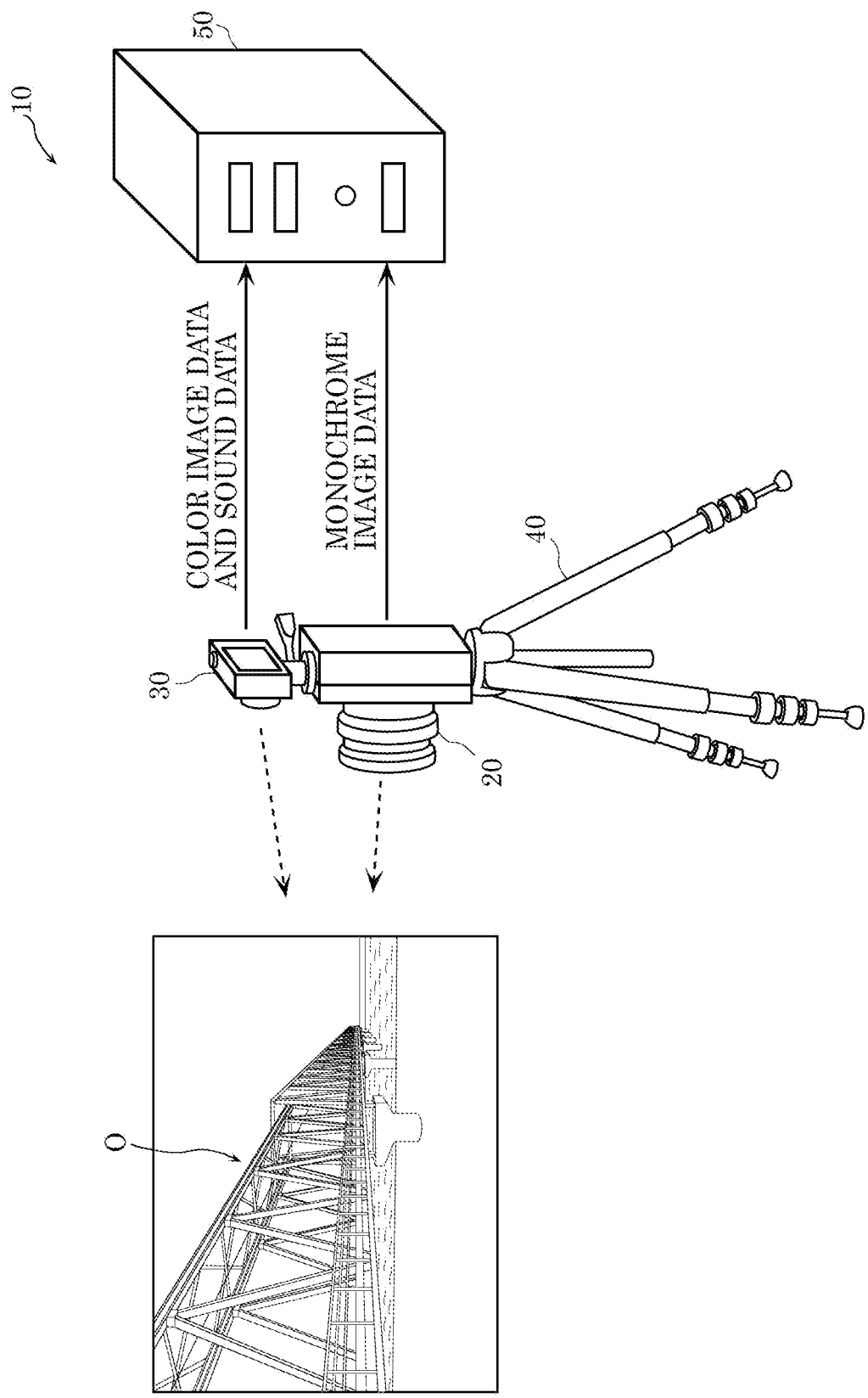
FIG. 1 is a schematic diagram showing a configuration of an information presentation system according to Embodiment 1.

DETAILED DESCRIPTION OF THE EMBODIMENTS (Summary of the Present Disclosure)

An information presentation method according to an aspect of the present disclosure includes: acquiring two or more monochrome images obtained by image-capturing a structure using a first image capturing device and one or more first color images obtained by image-capturing the structure using a second image capturing device that is different from the first image capturing device, the one or more first color images having a less amount of information than an amount of information of the two or more monochrome images; detecting a displacement that indicates a movement of the structure based on the two or more monochrome images; generating presentation information that includes one or more second color images that present information that indicates the displacement based on the two or more monochrome images and the one or more first color images; and outputting the presentation information.

With this configuration, the displacement of the structure can be detected based on the monochrome images, and thus the displacement of the structure can be detected with higher accuracy than when the displacement is detected based on the first color images. That is, highly accurate displacement measurement of the structure can be performed. Also, the color images (second color images) that include information that indicates the detected displacement is output as presentation information, and thus the result can be presented in a more easily comprehensible manner than when the monochrome images are output. Accordingly, with the information presentation method according to an aspect of the present disclosure, it is possible to perform highly accurate displacement measurement on a structure and present a measurement result in an easily comprehensible manner.

For example, in the case where the structure is an infrastructure structure, the result of detection performed based on images captured using the image capturing devices may be checked by people other than inspectors. As used herein, "people other than inspectors" are, for example, people (hereinafter also referred to as "non-inspectors") who do not have technical knowledge on inspection such as managers of the infrastructure structure, or the like. Accordingly, it has been desired to present a measurement result in such a way that even non-inspectors are comprehensible.

With the method described above, the measurement result is presented as a color image, and thus the result can be presented in an easily comprehensible manner so that even non-inspectors can understand the state of the structure. That is, with the method described above, it is possible to achieve both highly accurate displacement measurement using images and presentation of measurement results in an easily comprehensible manner.

Also, the generating of the presentation information may include: associating the two or more monochrome images with the one or more first color images in terms of pixel position; and generating the second color images by superimposing the information that indicates the displacement on the one or more first color images based on a result of association obtained in the associating.

With this configuration, the generated second color images are images in which the measurement result (the information that indicates the displacement) obtained based on the monochrome images is superimposed on the first color images that have a less amount of information. Accordingly, it is possible to achieve both highly accurate displacement measurement and presentation of displacement result in an easily comprehensible manner, while suppressing an increase in the amount of information of the presentation information.

Also, in the case where only the second color images are stored in a storage device, because the monochrome images that have a large amount of information are not stored, it is possible to reduce the storage capacity for storing measurement results.

Also, the generating of the presentation information may include: associating the two or more monochrome images with the one or more first color images in terms of pixel position; acquiring color information based on the one or more first color images; generating one or more third color images from the two or more monochrome images based on a result of association obtained in the associating and the color information; and generating the second color images by superimposing the information that indicates the displacement on the third color images.

With this configuration, the generated second color images are images in which the measurement result (the information that indicates the displacement) obtained based on the monochrome images is superimposed on one or more third color images obtained by colorizing the monochrome images that have a large amount of information. That is, the presentation information includes an image in which the measurement result is superimposed on a high-resolution color image. Accordingly, it is possible to present the measurement result in a more easily comprehensible manner.

Also, in the case where only the second color images are stored in a storage device, when it is necessary to perform an additional displacement measurement (for example, when displacement measurement is performed on the structure shown in the second color images at a position at which displacement measurement has not been performed yet), the additional displacement measurement can be performed with high accuracy using the second color images. That is, highly accurate displacement measurement can be performed at a desired position using the second color images without capturing additional images.

Also, the first image capturing device may be a monochrome camera, and the second image capturing device may be a color camera.

With this configuration, both highly accurate displacement measurement and presentation of measurement results in an easily comprehensible manner can be achieved based on the monochrome images captured using the monochrome camera and the first color images captured using the color camera. For example, in general, a monochrome camera can capture images of a resolution higher than a color camera. For this reason, by performing displacement measurement based on monochrome images captured using the monochrome camera, the displacement can be measured with high accuracy and with ease. Also, by using color images captured using the color camera, it is possible to easily acquire color images in which an increase in capacity is suppressed and that are not for use in displacement measurement.

Also, the information that indicates the displacement may include a displacement vector that indicates a positional change of the structure in the two or more monochrome images.

With this configuration, as the information that indicates the displacement, a displacement vector is superimposed on the second color images. A non-inspector can easily know the size, orientation, and the like of the displacement by simply looking at the displacement vector. That is, the measurement result can be presented in a more easily comprehensible manner.

Also, in the acquiring, sound information obtained when image-capturing the structure may be further acquired, and in the generating of the presentation information, the presentation information that further includes the sound information may be generated.

With this configuration, the state during image capturing (for example, whether or not a vehicle is approaching, conversation voices, and the like) can be checked at a later time. For example, sound is output as the measurement result, and thus even a person who was not in the image capturing location (for example, a non-inspector or the like) can easily understand the state during image capturing based on the output sound. Also, an anomaly can be detected based on an unusual sound.

Also, a period in which the two or more monochrome images are captured and a period in which the one or more first color images are captured may include an identical period.

With this configuration, by superimposing the displacement detected based on the monochrome images on, for example, the color images based on the images captured in the identical period as the monochrome images, the measurement result can be presented in a more easily comprehensible manner. For example, it is possible to present a measurement result with which image capturing information is easily comprehensible. The images captured in the identical period as the monochrome images may be the monochrome images or the first color images. Also, the color images based on the images captured in the identical period as the monochrome images may be the first color images or the third color images.

Also, at least one image from among the two or more monochrome images and the one or more first color images may be an image captured while a load is applied to the structure.

With this configuration, for example, when at least one of the two or more monochrome images is captured while a load is applied to the structure, if there is an anomaly in a portion of the structure, a significant displacement may be observed between the portion of the structure and other portions of the structure in the measurement result. That is, an anomaly in the structure can be easily detected. Also, when the one or more first color images are captured while a load is applied to the structure, the state of the structure while a load is applied to the structure can be presented. That is, the measurement result can be presented in a more easily comprehensible manner.

Also, the one or more first color images may be images with a resolution lower than a resolution of the two or more monochrome images.

With this configuration, the amount of displacement can be detected with high accuracy based on the monochrome images, while suppressing the capacity of the first color images.

Also, the one or more first color images may be images with a frame rate lower than a frame rate of the two or more monochrome images.

With this configuration, it is possible to more accurately (more finely) detect changes in displacement over time based on the monochrome images, while suppressing the capacity of the first color images.

Also, the two or more monochrome images acquired in the acquiring may be images obtained by performing lossless compression on the two or more monochrome images captured using the first image capturing device, and the one or more first color images acquired in the acquiring may be images obtained by performing lossy compression on the one or more first color images captured using the second image capturing device.

With this configuration, the storage capacity for storing images captured using the image capturing devices can be reduced. Also, the monochrome images are compressed using lossless compression, and thus degradation does not occur when compressed data is decoded. Accordingly, the displacement can be detected with high accuracy based on the decoded monochrome images. Also, the color images are compressed using lossy compression, and thus the capacity of the color images can be further reduced.

Also, the two or more monochrome images may be images captured using the first image capturing device that includes a global shutter image sensor.

With this configuration, the two or more monochrome images have less image blur, and thus the displacement of the structure can be measured with high accuracy.

Also, the one or more first color images may be images captured using the second image capturing device that includes a rolling shutter image sensor.

With this configuration, the color camera includes a rolling shutter image sensor, and thus the cost of the color camera can be reduced. Accordingly, a more highly accurate measurement result can be acquired at low cost.

An information presentation device according to an aspect of the present disclosure includes: a first acquirer that acquires two or more monochrome images obtained by image-capturing a structure using a first image capturing device; a second acquirer that acquires one or more first color images that are obtained by image-capturing the structure using a second image capturing device that is different from the first image capturing device, the one or more first color images having a less amount of information than an amount of information of the two or more monochrome images; a displacement detector that detects a displacement that indicates a movement of the structure based on the two or more monochrome images; a presentation information generator that generates presentation information that includes one or more second color images that present information that indicates the displacement based on the two or more monochrome images and the one or more first color images; and an outputter that outputs the presentation information.

With this configuration, the same advantageous effects as those of the information presentation method described above can be obtained.

An information presentation system according to an aspect of the present disclosure includes: the above-described information presentation device; a monochrome camera that captures the two or more monochrome images of the structure and outputs the two or more monochrome images captured to the information presentation device; and a color camera that captures the one or more first color images of the structure and outputs the one or more first color images captured to the information presentation device.

With this configuration, it is possible to implement an information presentation system in which highly accurate displacement measurement can be performed on the structure by using the monochrome images captured by the monochrome camera and the first color images captured by the color camera, and a measurement result can be presented in an easily comprehensible manner.

The generic or specific aspects of the present disclosure may be implemented by a system, a method, an integrated circuit, a computer program or a computer readable non-transitory recording medium such as a CD-ROM, or may be implemented by any combination of a system, a method, an integrated circuit, a computer program, and a recording medium. The program may be stored in advance in the recording medium, or may be supplied to the recording medium via a wide area communication network such as the Internet.

Hereinafter, embodiments will be described specifically with reference to the drawings.

The embodiments and variations described below show generic or specific examples of the present disclosure. The numerical values, shapes, materials, structural elements, the arrangement and connection of the structural elements, steps, the order of the steps, and the like shown in the embodiments and variations given below are merely examples, and therefore are not intended to limit the scope of the present disclosure. Also, among the structural elements described in the embodiments given below, structural elements not recited in any one of the independent claims are described as arbitrary structural elements.

The diagrams are schematic representations, and thus are not necessarily true to scale. Also, in the diagrams, structural elements that are substantially the same are given the same reference numerals, and a redundant description may be omitted or simplified.

Also, in the specification of the present application, the terms that describe the relationship between elements such as "same" and numerical values are expressions that not only have a strict meaning but also encompass a substantially equal range, for example, a margin of about several percent.

Also, in the description given below in this specification, examples will be described in which the term "image" (including, for example, "monochrome image" and "color image") refers to moving image. However, the term "image" may refer to still image. A moving image is composed of a plurality of still images.

Embodiment 1

Hereinafter, an information presentation method and the like according to the present embodiment will be described with reference to FIGS. 1 to 5.

[1-1. Configuration of Information Presentation System]

Figure 2:
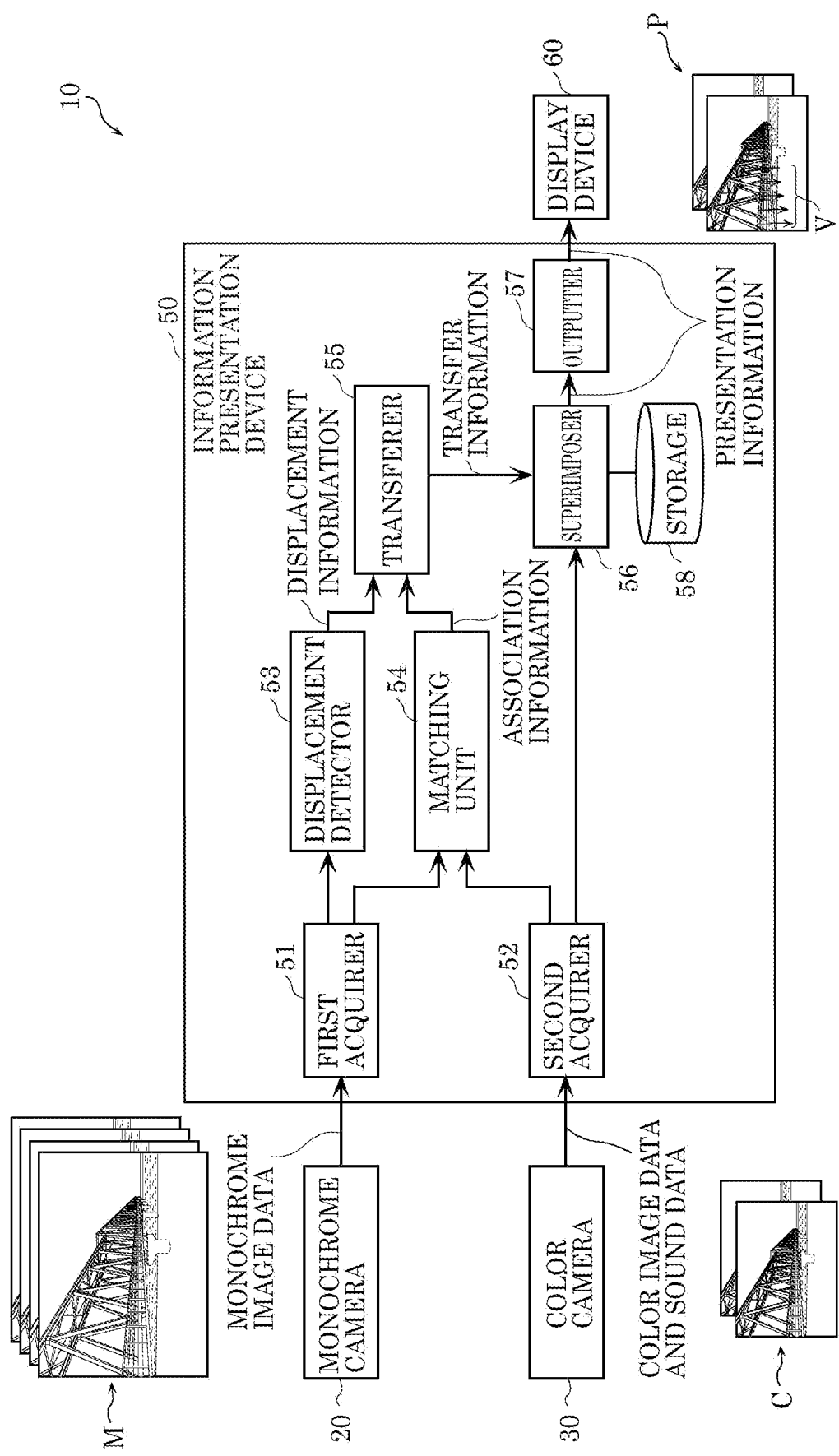
FIG. 2 is a block diagram showing a functional configuration of the information presentation system according to Embodiment 1.

First, information presentation system 10 that includes an information presentation device that executes an information presentation method according to the present embodiment will be described with reference to FIGS. 1 to 4. FIG. 1 is a schematic diagram showing a configuration of information presentation system 10 according to the present embodiment. FIG. 2 is a block diagram showing a functional configuration of information presentation system 10 according to the present embodiment.

As shown in FIGS. 1 and 2, information presentation system 10 is, for example, a measurement result presentation system that captures images of structure O, measures a displacement of structure O based on the captured images, and presents the result of measurement. In other words, information presentation system 10 is a system that performs checkups of structure O by using images and presents the result of checkup. Structure O is an example of a measurement target on which information presentation system 10 performs displacement measurement, and may be, for example, an infrastructure structure such as a bridge. Structure O may be, for example, a bridge over which vehicles such as automobiles or trains run.

Information presentation system 10 includes monochrome camera 20, color camera 30, information presentation device 50, and display device 60. Information presentation system 10 does not necessarily need to include display device 60.

Monochrome camera 20 and color camera 30 are image capturing devices that capture images that are used for inspection of structure O, and output the captured images to information presentation device 50. Monochrome camera 20 and color camera 30 may be, for example, digital video cameras or digital still cameras that include an image sensor.

Monochrome camera 20 outputs monochrome image data of captured monochrome images of structure O to information presentation device 50. In the case where the images indicated by the monochrome image data (hereinafter also referred to as "monochrome images") are still images, monochrome camera 20 outputs two or more monochrome images to information presentation device 50 so as to perform displacement measurement on structure O. Monochrome camera 20 may include a global shutter image sensor or a rolling shutter image sensor. However, from the viewpoint of performing highly accurate displacement detection, monochrome camera 20 favorably includes a global shutter image sensor (for example, a CCD (Charge Coupled Device) image sensor). In other words, the monochrome images are favorably captured by monochrome camera 20 that includes a global shutter image sensor. The monochrome image data according to the present embodiment is not monochrome images generated by subjecting color images captured by color camera 30 to image processing. The term "monochrome image" used in the specification of the present application refers to, for example, black-and-white (gray-scale) image. Also, monochrome camera 20 is an example of a first image capturing device.

Color camera 30 outputs color image data of captured color images of structure O to information presentation device 50. In the case where the images (hereinafter also referred to as "first color images") indicated by the color image data are still images, color camera 30 outputs one or more first color images to information presentation device 50 so as to superimpose the displacement of structure O on the first color images. Color camera 30 may include a global shutter image sensor or a rolling shutter image sensor. However, from the viewpoint of reducing the cost of color camera 30, color camera 30 favorably includes a rolling shutter image sensor. In other words, the first color images may be images captured by color camera 30 that includes a rolling shutter image sensor (for example, CMOS (Complementary Metal Oxide Semiconductor) image sensor). Also, color camera 30 is an image capturing device that is different from monochrome camera 20, and is an example of a second image capturing device.

As described above, information presentation system 10 according to the present embodiment captures images of the same structure, namely, structure O, by using different image capturing devices.

Also, monochrome camera 20 and color camera 30 may perform processing of embedding a time stamp in each frame of captured images. Also, monochrome camera 20 and color camera 30 each may include a GPS (Global Positioning System) clock, and output image data that contains time obtained via the GPS clock to information presentation device 50. As a result of monochrome camera 20 and color camera 30 each including a GPS clock, synchronization between monochrome images and first color images can be easily checked. That is, the amount of processing of matching unit 54, which will be described later, can be reduced, which leads to a reduction in the processing time and the consumption power of information presentation device 50.

The color image data is image data that has a less amount of information than that of the monochrome image data. As used herein, the expression "a less amount of information" means that the amount of information is insufficient to perform displacement measurement on structure O. Specifically, the expression "a less amount of information" encompasses at least one of the following: the resolution of the color image data is lower than the resolution of the monochrome image data; and the frame rate of the color image data is lower than the frame rate of the monochrome image. In other words, the first color images are images in which at least one of resolution and frame rate is lower than that of the monochrome images.

The resolution and the frame rate of the first color images may be set to any values as long as inspectors or the like can recognize the state of structure O and the state of the surroundings of structure O when they see the first color images. Likewise, the resolution and the frame rate of the monochrome images may be set to any values as long as the displacement of structure O can be measured, and may be determined as appropriate according to the amount of displacement that needs to be measured, or the like. For example, the resolution of the first color images is HD (1440×1080), and the resolution of the monochrome images is 4K (3840×2160). Also, for example, the frame rate of the first color images is 60 fps (frames per second), and the frame rate of the monochrome image is 200 fps.

In FIG. 2, the image size indicates resolution, and the number of images indicates frame rate. That is, in FIG. 2, an example is shown in which the resolution of the first color images is lower than the resolution of the monochrome images, and the frame rate of the first color images is lower than the frame rate of the monochrome images.

Also, the monochrome image data may be image data generated by performing predetermined image processing on the images captured by monochrome camera 20, and the color image data may be image data generated by performing predetermined image processing on the images captured by color camera 30. As used herein, the predetermined image processing may be, for example, image data compression processing (encoding processing) so as to reduce the capacity of the image data.

For example, the monochrome image data acquired by information presentation device 50 may be image data generated from images obtained by compressing the images captured by monochrome camera 20 at a first compression ratio. Also, for example, the color image data acquired by information presentation device 50 may be image data generated from images obtained by compressing the images captured by color camera 30 at a second compression ratio.

The second compression ratio is higher than the first compression ratio. The expression "a less amount of information" encompasses that the second compression ratio is higher than the first compression ratio. Also, for example, the images captured by color camera 30 are compressed, but the images captured by monochrome camera 20 are not necessarily compressed, which is also equivalent to "the second compression ratio is higher than the first compression ratio". That is, the monochrome image data may be image data generated from non-compressed images. Also, for example, the color image data may be generated by performing lossy compression on the images captured by color camera 30, and the monochrome image data may be generated by performing lossless compression on the images captured by monochrome camera 20. That is, the monochrome images may be lossless information and the color images may be lossy information. There is no particular limitation on the method of lossless compression and the method of lossy compression.

The first color images may be compressed by compression processing such as H. 264 compression. The predetermined image processing may be, for example, processing of thinning out some of the pixels of the captured images. For example, in the case where monochrome camera 20 and color camera 30 capture images of the same resolution, color camera 30 may generate the first color images that have a less amount of information than that of the monochrome images by thinning out more pixels than monochrome camera 20.

In the case where image processing (for example, compression processing) is performed as described above, the same image capturing conditions (for example, the conditions including resolution, frame rate, and the like) may be used for monochrome camera 20 and color camera 30. That is, the image capturing conditions may be set such that, as a result of performing image processing on the images captured by monochrome camera 20 and color camera 30, the amount of information of the first color images acquired by second acquirer 52 is smaller than that of the monochrome images acquired by first acquirer 51.

Also, color camera 30 may include a microphone and a speaker, and output, together with the color image data, sound information (sound data) to information presentation device 50, the sound information containing the sound generated when images of structure O were captured. The microphone and the speaker may be included in monochrome camera 20. Monochrome camera 20 or color camera 30 do not necessarily need to output the sound information to information presentation device 50.

FIG. 1 shows an example in which monochrome camera 20 and color camera 30 are fixed to one tripod 40, or in other words, monochrome camera 20 and color camera 30 are provided such that they have the same distance to structure O and the same orientation relative to structure O, but the configuration is not limited thereto. The distance to structure O and the orientation relative to structure O may be set as appropriate for each of monochrome camera 20 and color camera 30. For example, monochrome camera 20 and color camera 30 may have different angles of view or different optical axes.

Also, the monochrome images and the first color images may be images captured asynchronously as long as they are captured simultaneously. That is, monochrome camera 20 and color camera 30 may independently perform image capturing so as to include the identical period. The monochrome images and the first color images are not limited to images captured so as to include the identical period. For example, if the same situation can be reproduced even when the time or the date is changed such as a predetermined train passing on structure O, monochrome camera 20 and color camera 30 do not necessarily need to perform image capturing at the same time.

Information presentation device 50 is a measurement result presentation device that outputs, to display device 60, presentation information that indicates the measurement result obtained by performing displacement measurement on structure O based on the monochrome image data acquired from monochrome camera 20 and the color image data acquired from color camera 30. As shown in FIG. 2, information presentation device 50 includes first acquirer 51, second acquirer 52, displacement detector 53, matching unit 54, transferer 55, superimposer 56, outputter 57, and storage 58. The structural elements included in information presentation device 50 may be implemented by, for example, a program executor such as a CPU (Central Processing Unit) or a processor reading a software program recorded on a recording medium such as a hard disk or a semiconductor memory and executing the software program.

First acquirer 51 is an acquirer that acquires monochrome image data of monochrome images of structure O captured by monochrome camera 20. First acquirer 51 outputs the acquired monochrome image data to displacement detector 53 and matching unit 54.

Second acquirer 52 is an acquirer that acquires the color image data of the color images of structure O captured by color camera 30. In the present embodiment, second acquirer 52 further acquires, from color camera 30, the sound information generated when the images of structure O were captured. Second acquirer 52 outputs the acquired color image data to matching unit 54 and superimposer 56. Also, second acquirer 52 outputs the sound information to superimposer 56 together with the color image data.

There is no particular limitation on the method of acquiring image data performed by first acquirer 51 and second acquirer 52. First acquirer 51 and second acquirer 52 may acquire image data from monochrome camera 20 and color camera 30 through wireless or wired communication, or may acquire image data from monochrome camera 20 and color camera 30 via a removable memory (for example, a USB (Universal Serial Bus) memory).

First acquirer 51 and second acquirer 52 are communication interfaces that are communicably connected to monochrome camera 20 and color camera 30 through wireless or wired communication. First acquirer 51 and second acquirer 52 may be configured as a single acquirer.

Figure 3A:
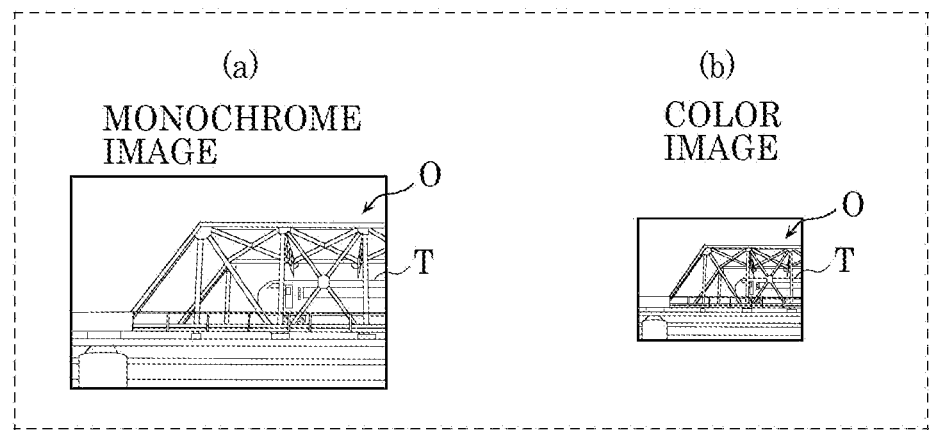
FIG. 3A is a diagram showing a first example of image data acquired by an information presentation device according to Embodiment 1.
Figure 3B:
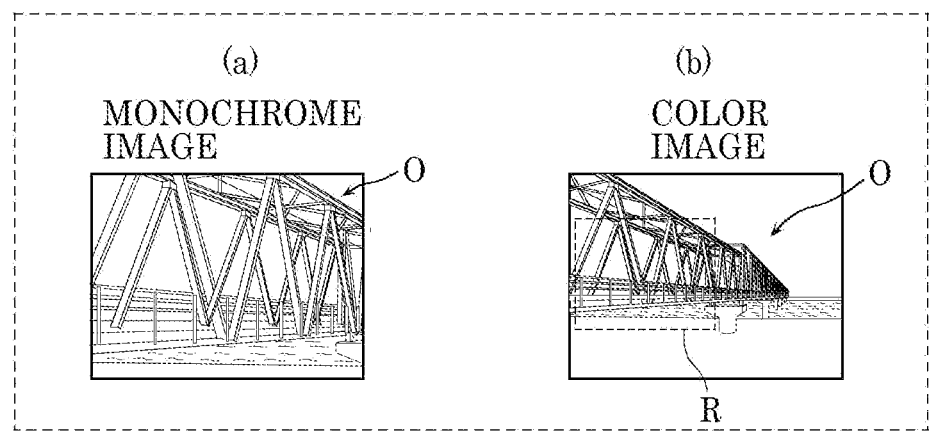
FIG. 3B is a diagram showing a second example of image data acquired by the information presentation device according to Embodiment 1.
Figure 3C:
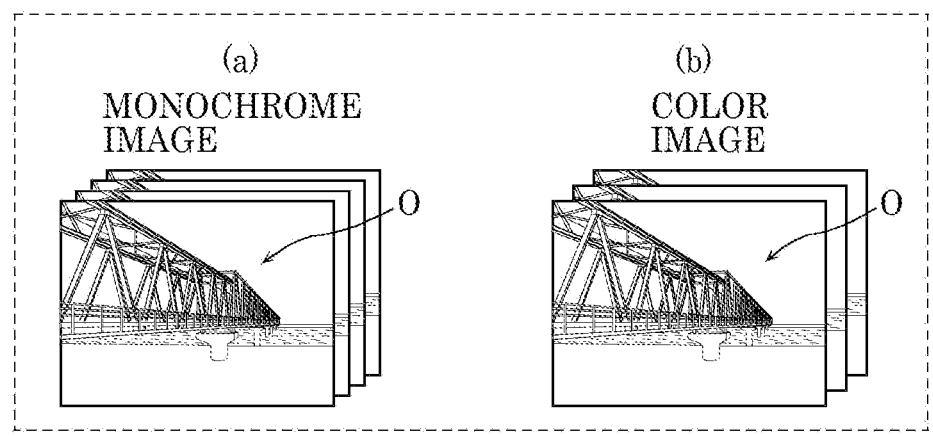
FIG. 3C is a diagram showing a third example of image data acquired by the information presentation device according to Embodiment 1.

The image data acquired by first acquirer 51 and second acquirer 52 will now be described here with reference to FIGS. 3A to 3C. FIG. 3A is a diagram showing a first example of image data acquired by information presentation device 50 according to the present embodiment. FIG. 3B is a diagram showing a second example of image data acquired by information presentation device 50 according to the present embodiment. FIG. 3C is a diagram showing a third example of image data acquired by information presentation device 50 according to the present embodiment.

As shown in (a) and (b) in FIG. 3A, at least one image from among the two or more monochrome images and the one or more first color images may be an image captured when a load is applied to structure O such as when vehicle T is passing on structure O (for example, a bridge). In other words, at least one of monochrome camera 20 and color camera 30 captures images of structure O so as to include, for example, a period in which a load is applied to structure O. From the viewpoint of noticeably detecting a displacement of structure O, at least one of the two or more monochrome images may be captured during a period in which a load is applied to structure O.

As shown in (a) and (b) in FIG. 3B, the monochrome image may be a captured image of a partial region of the first color image (for example, dotted line region R shown in (b) in FIG. 3B). The monochrome image may be an image that includes at least a portion of structure O on which displacement measurement needs to be performed. Monochrome camera 20 may be, for example, an image capturing device that can capture images with an angle of view smaller than that of color camera 30. Also, monochrome camera 20 may capture images of structure O under image capturing conditions where the monochrome images show a partial region of the first color images.

Also, the first color images may be images obtained by image-capturing a region wider than that of the monochrome images. Color camera 30 may be, for example, an image capturing device that can capture images at an angle of view wider than that of monochrome camera 20, and may be, for example, an omnidirectional camera (360° camera). Also, color camera 30 may capture images of structure O under image capturing conditions where the monochrome images show a partial region of the first color images. With this configuration, positional alignment by matching unit 54 can be easily performed.

As shown in (a) and (b) in FIG. 3C, the first color image may be an image that has a frame rate lower than that of the monochrome image. The first color image may be an image that has a resolution equal to that of the monochrome image and a frame rate lower than that of the monochrome image.

Referring back to FIG. 2, displacement detector 53 is a processing unit that detects, based on the monochrome images, a displacement that indicates a movement of structure O. The displacement of structure O refers to a movement of structure O, and includes at least one of: the direction in which structure O has moved; and the amount of movement of structure O. When displacement detector 53 acquires two monochrome images (two still images), displacement detector 53 sets the position of structure O in one of the monochrome image data (for example, the monochrome image data that was captured earlier than the other monochrome image data) as a reference, and measures the displacement of structure O based on the position of structure O in the reference monochrome image and in the other monochrome image. Likewise, when displacement detector 53 acquires three or more monochrome image data, displacement detector 53 sets the position of structure O in one of the three or more monochrome image data as a reference, and obtains time series data of the displacement of structure O based on the position of structure O in the reference monochrome image data and in the other reference monochrome image data. As the reference monochrome image, an image obtained by image-capturing structure O when structure O is not displaced, or an image obtained by image-capturing structure O when vehicle T is not passing on structure O may be used.

As described above, displacement detector 53 measures the displacement of structure O based only on the monochrome images from among the monochrome images and the first color images. The monochrome images are images captured by monochrome camera 20 and have an amount of information larger than that of the first color images. By measuring the displacement based on the monochrome images, displacement detector 53 can measure the displacement with higher accuracy as compared with when the displacement is measured based on the first color images.

Displacement detector 53 measures, for example, a displacement of structure O between frames of the monochrome images (two or more monochrome images in the case where the monochrome images are still images). Displacement detector 53 can use an ordinary displacement detection method such as, for example, block matching, a correlation method, a sampling moire method, or a feature point tracking method. As the correlation method, a normalized cross correlation method, a phase correlation method, a laser speckle correlation method, or the like can be used. The accuracy of displacement detection may be expressed in the unit of pixels or sub-pixels. Alternatively, the displacement may be detected by using feature point tracking such as SIFT (Scale Invariant Feature Transform).

Displacement detector 53 calculates, for example, information that indicates the measured displacement (hereinafter also referred to as "displacement information"), and outputs the displacement information to transferer 55. The displacement information may include, for example, displacement vectors (motion vectors, see displacement vectors V1 to V4 shown in FIG. 4) that show changes in the position of structure O. Displacement detector 53 calculates displacement vectors in each of the monochrome images that are images other than the reference monochrome image. An inspector or the like can be easily aware of changes in the displacement of structure O over time by checking the displacement information that includes the displacement vectors.

The displacement information is not limited to displacement vectors as long as it is information with which the degree of displacement and the features of displacement can be visually recognized. The displacement information may be, for example, information that indicates the deformation, vibrations, strain, or the like of structure O. In the case where, for example, information that indicates the deformation of structure O is used, the displacement information may be a curve that indicates the shape of deformed structure O.

Matching unit 54 is a processing unit that associates, based on the monochrome images and the first color images, each frame of the monochrome images with each frame of the first color images in terms of time and pixel position. Matching unit 54 estimates the association relationship between the monochrome images and the first color images by using, for example, image recognition. The association in terms of time is processing in which each frame of the monochrome images is associated with one of the frames of the first color images captured at a time close to the time when the frame of the monochrome images was captured. Likewise, the association in terms of pixel position includes performing positional alignment between structure O in the monochrome images and structure O in the first color images. The association as described above needs to be performed if the monochrome images and the first color images are different in terms of at least one of resolution, frame rate, and viewing point.

Matching unit 54 extracts feature points from each frame of the monochrome images and each frame of the first color images, and associates the monochrome images with the first color images in terms of time and pixel position, based on the association relationship between extracted feature points. The association processing performed by matching unit 54 will now be described here with reference to FIG. 4. FIG. 4 is a diagram illustrating association between monochrome images M and first color images C according to the present embodiment. Here, an example will be described in which four monochrome images (four frames) M1 to M4 and two first color images (two frames) C1 and C2 are used. Also, as an example, the frame rate of the monochrome images is set to 200 fps, and the frame rate of the first color images is set to 60 fps. Matching unit 54 detects feature points such as, for example, SIFT, ORB (Oriented FAST and Rotated BRIEF), or BRISK (Binary Robust Invariant Scalable Keypoints).

Matching unit 54 extracts feature points from each of monochrome images M1 to M4 and first color images C1 and C2. Then, matching unit 54 associates, based on the association relationship between extracted feature points, monochrome images M1 to M4 with first color images C1 and C2 in terms of time. FIG. 4 shows an example in which first color image C1 is an image captured during a period in which monochrome images M1 and M2 were captured, and is associated with monochrome images M1 and M2. Also, FIG. 4 shows an example in which first color image C2 is an image captured during a period in which monochrome images M3 and M4 were captured, and is associated with monochrome images M3 and M4. Here, it is sufficient that a first color image is associated with at least one monochrome image. For example, first color image C1 may be associated only with monochrome image M1 that is one of monochrome images M1 and M2 that was captured at a time close to the time when first color image C1 was captured.

With the association method described above, monochrome camera 20 and color camera 30 each include an internal clock, and thus the monochrome images and the first color images can be associated in terms of time with high accuracy based on the time indicated by each of the internal clocks. As the internal clocks, for example, general-purpose timer ICs (timer circuits), real time clock ICs, or the like that indicate the current time can be used. Also, with the association method described above, constraints on selecting monochrome camera 20 and color camera 30 are reduced. That is, even if monochrome camera 20 and color camera 30 are cameras that are not in synchronization with each other (for example, commercially available cameras), the monochrome images and the first color images can be associated with each other in terms of time. Accordingly, the practical use of information presentation system 10 according to the present embodiment is improved.

Next, matching unit 54 performs positional alignment based on the monochrome images and the first color images that were associated with each other in terms of time. Specifically, matching unit 54 performs positional alignment based on the association relationship of feature amount between the monochrome images and the first color images that were associated with each other in terms of time.

In the case where a moving object (for example, vehicle T) is shown in the images, matching unit 54 may perform association in terms of position by combining the association of feature points described above with object recognition and object tracking of the moving object, or performing object recognition and object tracking of the moving object instead of performing the association of feature points described above.

In the case where the monochrome image data and the color image data include time information acquired via the GPS clocks, matching unit 54 may perform association in terms of time by using the time information. In the case where two monochrome image data and one color image data are acquired, matching unit 54 does not necessarily perform association processing in terms of time. That is, it is sufficient that matching unit 54 performs association in terms of at least pixel position.

Matching unit 54 outputs, to transferer 55, association information in which the monochrome images and the first color images have been associated with each other.

Referring back to FIG. 2, transferer 55 is a processing unit that generates information (for example, displacement vectors) that is superimposed from one of; the monochrome images; and the first color images onto the other. In the present embodiment, transferer 55 is a processing unit that determines the form of presentation of the displacement result in the image for presenting the result of displacement detection based on the result of displacement detection performed by displacement detector 53 and the result of association performed by matching unit 54. Information presentation device 50 outputs presentation information that includes images obtained by superimposing displacement vectors on the first color images (the images being an example of second color images, see second color images P shown in FIG. 2). Also, displacement vectors V included in second color images P (arrows shown in second color images P) shown in FIG. 2 are an example of information that shows the displacement.

With the monochrome images and the first color images that have different resolutions and different viewing points, transferer 55 adjusts position, size, orientation, and the like in the first color images when information that indicates the displacement detected based on the monochrome images (the information being the displacement information, and for example, displacement vectors) is superimposed on the first color images. In other words, transferer 55 performs processing of converting the displacement information detected based on the monochrome images to transfer information that is information to be superimposed on the first color images. In the case where two or more monochrome images are associated with one first color image, transferer 55 may determine one transfer information that is information to be superimposed on the first color image based on the displacement between the two or more monochrome images, or may determine one transfer information that is information to be superimposed on the first color image based on a predetermined number of monochrome images (for example, one monochrome image) from among the two or more monochrome images. Then, transferer 55 outputs the determined transfer information to superimposer 56. Transferer 55 outputs, for example, displacement vectors to superimposer 56 as the transfer information.

This will be explained by taking FIG. 4 as an example. Transferer 55 determines, for example, displacement vector V5 that is a vector to be superimposed on first color image C1 based on at least one of displacement vectors V1 and V2. FIG. 4 shows an example in which displacement vector V5 is determined based on both displacement vectors V1 and V2. Transferer 55 may determine, for example, an average vector obtained by averaging displacement vectors V1 and V2 as displacement vector V5, or may determine an average vector obtained by averaging vectors obtained by calculating displacement vectors V1 and V2 with a predetermined coefficient (weight) as displacement vector V5. The predetermined coefficient may be determined such that, for example, the degree of influence on displacement vector V5 increases (for example, the predetermined coefficient takes a greater value) for the displacement vector in the monochrome image whose captured time is closer to the captured time of first color image C1. Also, transferer 55 may determine a displacement vector in the monochrome image whose captured time is closest to the captured time of the first color image (for example, displacement vector V1 in first color image C1) as displacement vector V5. Displacement vector V6 is also determined in the same manner based on displacement vectors V3 and V4. Displacement vectors V5 and V6 are information that indicates the displacement, and are an example of transfer information. The transfer information may include information for identifying the first color images that correspond to displacement vectors.

Referring back to FIG. 2, superimposer 56 is a processing unit that generates, based on the monochrome images and the first color images, presentation information that includes one or more second color images that present the displacement information. In the present embodiment, superimposer 56 generates presentation information by superimposing the transfer information based on the monochrome images and the first color images on the first color images. Specifically, superimposer 56 superimposes the displacement vectors included in the transfer information to the first color images that correspond to the displacement vectors. This will be explained by taking FIG. 4 as an example. Superimposer 56 superimposes displacement vector V5 on first color image C1, and superimposes displacement vector V6 on first color image C2.

Superimposer 56 outputs presentation information that was generated by superimposing the displacement vectors and that includes second color images to outputter 57. In the present embodiment, information presentation device 50 acquires sound data from color camera 30. That is, information presentation device 50 acquires first sound information included in the sound data from color camera 30. Accordingly, superimposer 56 outputs the image data that forms the second color images (hereinafter also referred to as "second color image data") and second sound information that corresponds to the second color image data to outputter 57. It is sufficient that superimposer 56 outputs at least the second color image data to outputter 57. The second color image data and the second sound information are an example of presentation information. Also, superimposer 56 is an example of a presentation information generator that generates presentation information.

The second sound information is information based on the first sound information, and may be, for example, data obtained by performing predetermined processing on the first sound information. The second sound information may be, for example, information obtained by extracting a portion of the first sound information. The second sound information may be, for example, sound information obtained when vehicle T is passing on structure O that has been extracted from the first sound information. Alternatively, the second sound information may be, for example, information obtained by extracting sound information with a volume greater than or equal to a predetermined volume from the first sound information. The predetermined processing may be any processing. The predetermined processing may be, for example, processing for outputting sound by emphasizing a predetermined sound (for example, an unusual sound in structure O). The second sound information may be information on which the predetermined processing is not performed. That is, the first sound information and the second sound information may be the same information.

Superimposer 56 may change the form of presentation of displacement vectors when the displacement vectors are superimposed on the first color images. In the case where, for example, the size or orientation of a displacement vector is outside of a predetermined range, superimposer 56 may superimpose the displacement vector on the first color image by displaying the displacement vector in a form different from other displacement vectors (for example, displaying the displacement vector with a color (for example, red) different from the color of other displacement vectors, or blinking the displacement vector).

Outputter 57 is an outputter that outputs the presentation information acquired from superimposer 56 to display device 60. There is no particular limitation on the method of outputting presentation information performed by outputter 57. Outputter 57 may output the presentation information to display device 60 through wireless or wired communication, or may output the presentation information to display device 60 via a removable memory (for example, a USB memory). Outputter 57 is a communication interface that is communicably connected to display device 60 through wireless or wired communication.

Storage 58 is a storage device in which the presentation information generated by superimposer 56 is stored. Storage 58 may store the monochrome image data acquired by first acquirer 51 and the color image data acquired by second acquirer 52. Also, storage 58 may store a control program that is executed by the processing units of information presentation device 50. Storage 58 is implemented by, for example, a semiconductor memory or the like.

Display device 60 is a device that acquires the presentation information from information presentation device 50, and outputs the presentation information in the form of an image. The image includes a photograph, an illustration, characters, and the like. Display device 60 may be a liquid crystal display or the like. The image output by display device 60 is visually checked by an inspector or the like, and is used by the inspector when determining whether or not there is an anomaly in structure O or whether or not it is necessary to perform an additional checkup or the like.

Display device 60 is an example of a presentation device. Information presentation system 10 may include, together with display device 60 or in place of display device 60, a device that outputs sound as the presentation device. Also, information presentation system 10 may include a device that displays the presentation information on a target such as a projector (for example, a screen) as the presentation device. In the case where information presentation device 50 is provided in a remote location, display device 60 may be connected to information presentation device 50 via a network. Also, display device 60 may be connected to monochrome camera 20 and color camera 30 via a network.

[1-2. Operations of Information Presentation Device]

Next, the operations of information presentation device 50 configured as described above will be described with reference to FIG. 5. FIG. 5 is a flowchart illustrating the operations of information presentation device 50 according to the present embodiment.

As shown in FIG. 5, information presentation device 50 acquires monochrome images and first color images (S10). In step S10, information presentation device 50 acquires monochrome images of structure O captured by monochrome camera 20 (an example of a first image capturing device) and first color images of structure O captured by color camera 30 (an example of a second image capturing device), the first color images having a less amount of information than that of the monochrome images. That is, information presentation device 50 acquires monochrome images and first color images of the same structure, namely, structure O, by using different image capturing devices.

Specifically, first acquirer 51 acquires monochrome image data from monochrome camera 20, and second acquirer 52 acquires color image data from color camera 30. There is no particular limitation on the timing when first acquirer 51 and second acquirer 52 acquire the image data, and the image data may be acquired sequentially while monochrome camera 20 and color camera 30 are capturing images or may be acquired after image capturing has been finished.

First acquirer 51 outputs the acquired monochrome image data to displacement detector 53 and matching unit 54. Second acquirer 52 outputs the acquired color image data to matching unit 54 and superimposer 56. Step S10 is an example of an acquiring step. Also, in the present embodiment, in the acquiring step, second acquirer 52 further acquires sound data (first sound information).

Next, displacement detector 53 detects a displacement of structure O based on the monochrome images (S20). Specifically, displacement detector 53 detects, based only on the monochrome images from among the monochrome images and the color images, a displacement of structure O shown in the monochrome images. Step S20 is an example of a detecting step.

Next, matching unit 54 performs matching of spatiotemporal corresponding points based on the monochrome images and the first color images (S30). Specifically, matching unit 54 extracts feature points from the monochrome images and the color images, and associates, based on the association relationship between extracted feature points, the monochrome images with the first color images in terms of at least one of time and space (position). In step S30, matching unit 54 associates, for example, the monochrome images with the first color images in terms of pixel position. Matching unit 54 outputs, to transferer 55, association information in which the monochrome images and the first color images have been associated with each other in terms of at least one of time and position. Step S30 is an example of an associating step.

Next, transferer 55 converts the displacement detected by displacement detector 53 according to the first color images (S40). Specifically, transferer 55 converts the displacement (for example, displacement vectors) detected by displacement detector 53 to transfer information that is information that indicates the displacement in the first color images, based on the size of the first color images, the displacement in each of a plurality of monochrome images that corresponds to the first color images, and the like. Transferer 55 outputs the transfer information obtained by converting the displacement information to superimposer 56.

Next, superimposer 56 generates presentation information that includes second color images by superimposing the transfer information (displacement) acquired from transferer 55 on the first color images (S50). Superimposer 56 generates the second color images by superimposing the transfer information on the first color images based on, for example, the result of association obtained in step S30. In the case where second acquirer 52 has acquired sound data (first sound information), the presentation information includes second sound information that is based on the first sound information. Step S50 is an example of a superimposing step.

Next, outputter 57 outputs the presentation information generated by superimposer 56 (S60). That is, information presentation device 50 causes display device 60 to display the presentation information. By doing so, the displacement measured with high accuracy based on the monochrome image data can be superimposed and displayed on the visually recognizable first color images. Step S60 is an example of an outputting step.

Steps S30 to S50 shown in FIG. 5 are an example of a presentation information generating step of generating presentation information that includes one or more second color images that present information that indicates the displacement based on the monochrome images and the first color images. It is sufficient that, in the presentation information generating step, the presentation information that includes one or more second color images can be generated, and thus, for example, steps S30 and S40 may be omitted. Also, in the present embodiment, in the presentation information generating step, the presentation information that further includes second sound information is generated.

As described above, information presentation device 50 according to the present embodiment associates the monochrome images with the first color images in terms of pixel position. Then, information presentation device 50 generates presentation information that includes one or more second color images by superimposing the displacement information on the first color images based on the result of association (which is also referred to as the result of matching, and is an example of association information).

Embodiment 2

Hereinafter, an information presentation method and the like according to the present embodiment will be described with reference to FIGS. 6 to 8. The following description will be given focusing mainly on differences from Embodiment 1. Accordingly, structural elements that are the same as those of Embodiment 1 will be given the same reference numerals, and a description thereof may be omitted or simplified.

[2-1. Configuration of Information Presentation System]

First, information presentation system 10a that includes information presentation device 50a that executes the information presentation method according to the present embodiment will be described with reference to FIGS. 6 and 7. FIG. 6 is a block diagram showing a functional configuration of information presentation system 10a according to the present embodiment.

Figure 6:
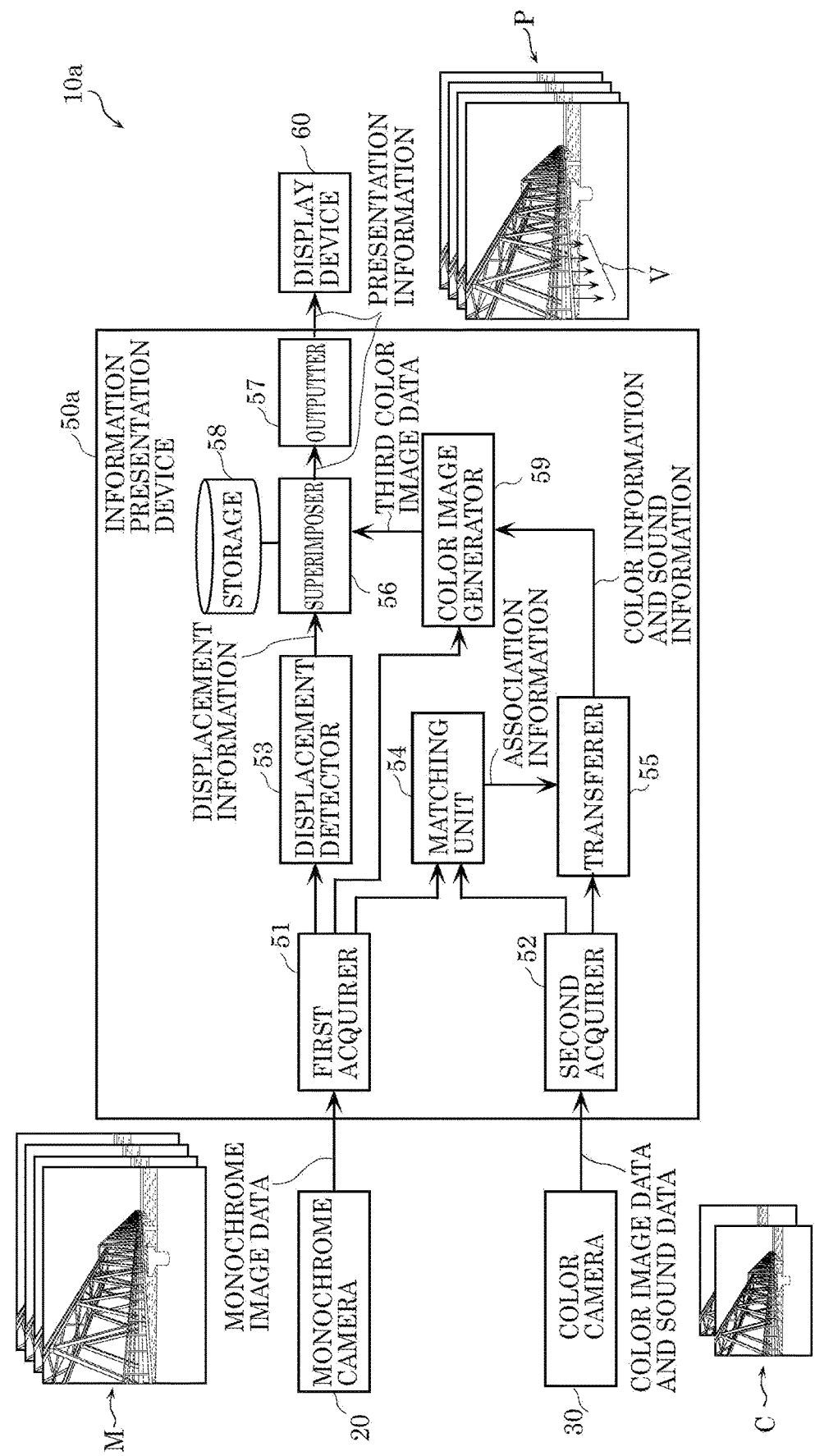
FIG. 6 is a block diagram showing a functional configuration of an information presentation system according to Embodiment 2.
Figure 7:
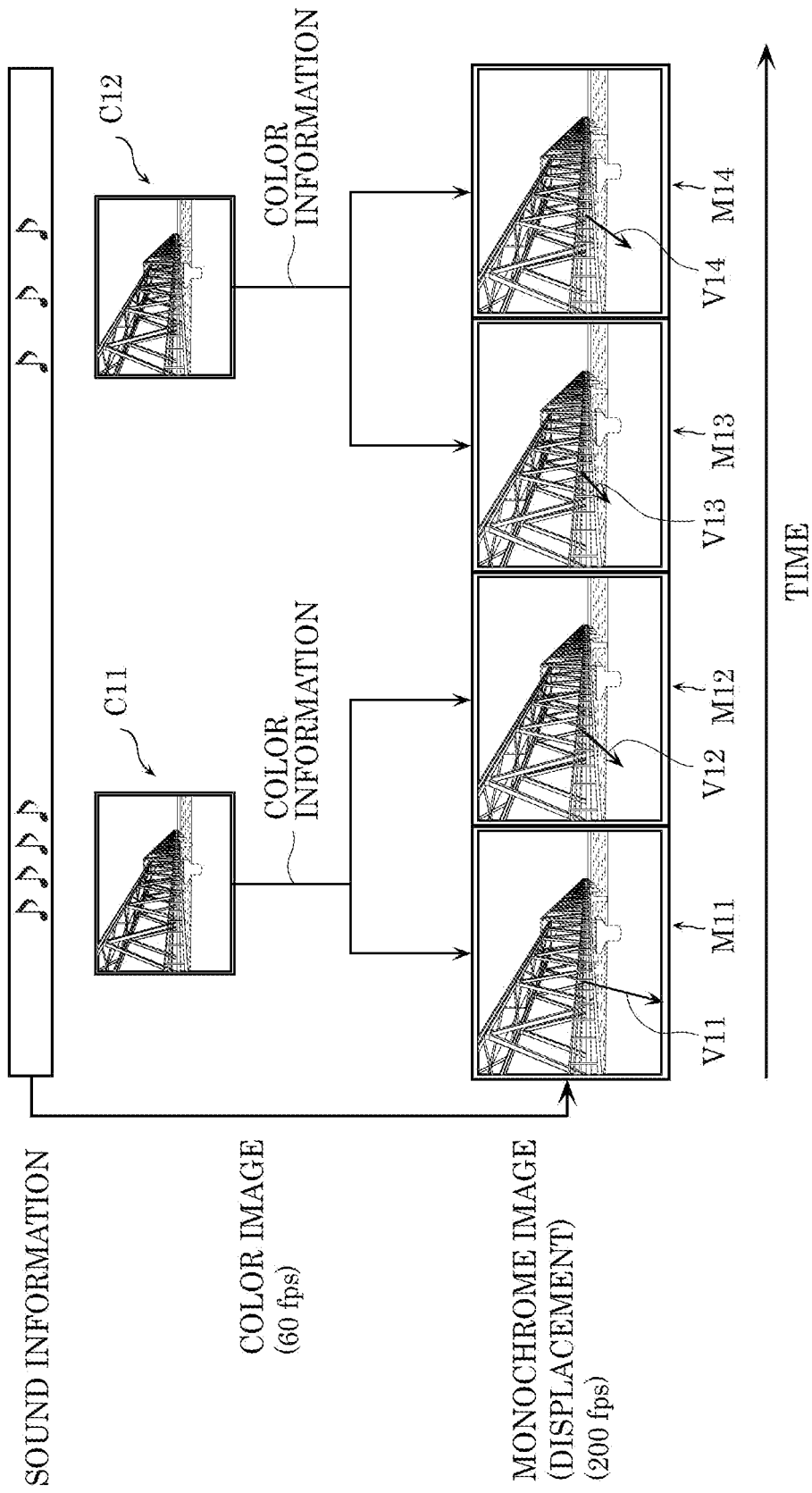
FIG. 7 is a diagram illustrating association between monochrome images and color images according to Embodiment 2.

As shown in FIG. 6, information presentation system 10a includes monochrome camera 20, color camera 30, information presentation device 50a, and display device 60. Information presentation system 10a according to the present embodiment is different from information presentation device 50 according to Embodiment 1 in that information presentation device 50a converts a monochrome image to a color image (an example of one or more third color images) based on the color information of the first color image.

Information presentation device 50a includes color image generator 59 in addition to the structural elements of information presentation device 50 according to Embodiment 1. Also, the processing performed by transferer 55 and superimposer 56 is different.

Transferer 55 is a processing unit that generates color information used to convert the monochrome images into color images based on the first color images and the result of association output from matching unit 54. Transferer 55 acquires first color information based on the first color images, and generates second color information that is used to convert the monochrome images to third color images based on the first color information and the result of association. Information presentation device 50a outputs images (an example of one or more second color images) in which the result of displacement measurement is superimposed on third color images obtained by colorizing the monochrome images based on the first color information. Using the monochrome images and the first color images that have different resolutions and different viewing points, transferer 55 converts the first color information acquired based on the first color images to second color information used to colorize the monochrome images based on the association information. In other words, transferer 55 performs processing for colorizing the monochrome images by using the first color information acquired based on the first color images (for example, transferring the first color information to the second color information). Hereinafter, the second color information may also be referred to simply as "color information".

In the case where two or more monochrome images are associated with one first color image, transferer 55 may associate the same second color information with each of the two or more monochrome images. Also, in the case where a plurality of monochrome image are captured during a period in which two first color images are captured, second color information that corresponds to the plurality of monochrome images may be determined based on the first color information of the two color images. Then, transferer 55 outputs the generated second color information to color image generator 59. The processing of generating color information performed by transferer 55 will now be described here with reference to FIG. 7. FIG. 7 is a diagram illustrating association between monochrome images and color images according to the present embodiment. Here, an example will be described in which four monochrome images (four frames) M11 to M14 and two first color images (two frames) C11 and C12 are used.

In order to, for example, add color information to monochrome images M11 and M12, transferer 55 generates the color information based on the first color information acquired from first color image C11 and the result of association. Also, in order to, for example, add color information to monochrome images M13 and M14, transferer 55 generates the color information based on the first color information acquired from first color image C12 and the result of association. In the case where a moving object such as vehicle T is not shown in the images, color information used to colorize monochrome images M11 to M14 may be determined based on first color images C11 and C12. That is, each of monochrome images M11 to M14 may be colorized based on one color information.

Referring back to FIG. 6, color image generator 59 is a processing unit that generates one or more third color images that have a high resolution by superimposing the color information on the monochrome images based on the monochrome image data and the color information. The third color images generated by superimposing the color information on the monochrome images are images that have an amount of information larger than the amount of information of the first color images acquired by second acquirer 52.

The function of color image generator 59 is not limited to colorizing the entire region of a monochrome image. Color image generator 59 may colorize, for example, only a region of a monochrome image in which a displacement has been detected and the periphery of the region. By doing so, an inspector can easily recognize which region in the image displayed on display device 60 needs to be carefully seen.

Color image generator 59 outputs color image data that forms the generated third color image to superimposer 56.

Superimposer 56 performs processing of superimposing the displacement on the third color images based on the displacement information. Superimposer 56 performs processing of, for example, superimposing displacement vectors V11 to V14 (see FIG. 7) included in the displacement information on the third color images corresponding to the displacement vectors. Taking monochrome image M11 shown in FIG. 7 as an example, superimposer 56 superimposes displacement vector V11 on monochrome image M11 obtained by colorizing first color image C11 based on the color information.

Superimposer 56 outputs the presentation information that includes the color image data that forms the second color images generated by superimposing the displacement vectors to outputter 57. In the present embodiment, information presentation device 50a acquires the first sound information from color camera 30. For this reason, superimposer 56 outputs the second color image data that forms the second color images and the second sound information that corresponds to the second color image data to outputter 57. It is sufficient that superimposer 56 outputs at least the second color image data to outputter 57. The second color image data and the second sound information are an example of presentation information.

[2-2. Operations of Information Presentation Device]

Next, the operations of information presentation device 50a configured as described above will be described with reference to FIG. 8. FIG. 8 is a flowchart illustrating the operations of information presentation device 50a according to the present embodiment. As the operations of information presentation device 50a, steps S70 and S80 are performed between step S30 and step S50 in addition to the operations of information presentation device 50 according to Embodiment 1. Also, the processing in step S50 is different.

As shown in FIG. 8, transferer 55 acquires second color information (color information) based on the first color image (S70). Specifically, transferer 55 calculates second color information used to colorize the monochrome images based on the first color information that is based on the first color images acquired by second acquirer 52 and the association information. In the case where the monochrome images and the first color images are images captured from the same viewing point, transferer 55 may acquire the second color information based only on the first color images from among the first color images and the association information. That is, the first color information and the second color information may be the same information. Then, transferer 55 outputs the second color information to color image generator 59. Step S70 is an example of a color information acquiring step.

Next, color image generator 59 generates one or more third color images from the monochrome images based on the result of matching acquired in step S30 (for example, association information) and the second color information (color information) (S80). The third color images are high-resolution color images that have the same resolution and frame rate as those of the monochrome images. Color image generator 59 outputs third color image data that forms the generated third color images to superimposer 56. In the case where second acquirer 52 has acquired first sound information, the third color image data includes second sound information. Step S80 is an example of a color image generating step.

Superimposer 56 generates presentation information that includes one or more second color images by superimposing the displacement detected by displacement detector 53 on the third color images (S50). In the case where second acquirer 52 has acquired first sound information, the presentation information includes second sound information.

Steps S30 to S50 shown in FIG. 8 are an example of a presentation information generating step of generating presentation information that includes one or more second color images that present information that indicates the displacement based on the monochrome images and the first color images. It is sufficient that, in the presentation information generating step, the presentation information that includes a second color image can be generated, and thus, for example, step S30 may be omitted.

As described above, information presentation device 50a according to the present embodiment generates one or more third color images from the monochrome images based on the result of association (association information) and the second color information generated based on the first color images. Then, information presentation device 50a generates presentation information that includes one or more second color images by superimposing the information that indicates the displacement (displacement information) on the third color images.

Other Embodiments

Although the information presentation method, the information presentation device, and the information presentation system according to one or more aspects of the present disclosure have been described above based on Embodiments 1 and 2 (hereinafter also referred to as "the embodiments and the like"), the present disclosure is not limited to the embodiments and the like given above. The one or more aspects of the present disclosure may also encompass embodiments obtained by making various modifications that can be conceived by a person having ordinary skill in the art to the embodiments and the like given above as well as embodiments implemented by any combination of the structural elements of different embodiments without departing from the scope of the one aspect of the present disclosure.

For example, the information presentation device according to the embodiments and the like given above may measure a displacement of fastening members (for example, bolts, nuts, or rivets) that fasten the constructs of a structure as the displacement of the structure. The displacement of fastening members include, for example, at least one of rotation angle and movement distance of the fastening members. The rotation angle includes the rotation direction and the angle by which rotation occurred, and the movement distance includes the movement direction and the distance by which movement occurred.

Also, in the embodiments and the like given above, an example has been described in which the first image capturing device is a monochrome camera and the second image capturing device is a color camera, but the configuration is not limited thereto. There is no particular limitation on the first image capturing device as long as the first image capturing device is an image capturing device that can output monochrome images to the information presentation device. Likewise, there is no particular limitation on the second image capturing device as long as the second image capturing device is an image capturing device that can output color images that have a less amount of information than that of monochrome images to the information presentation device.

Also, in the embodiments and the like given above, the information presentation device is configured to acquire images from one monochrome camera and one color camera, but the configuration is not limited thereto. The information presentation system may include a plurality of monochrome cameras and a plurality of color cameras that have different viewing points, and the information presentation device may acquire image data from each of the plurality of monochrome cameras and the plurality of color cameras. With this configuration, the displacement detector can detect a displacement in a three-dimensional space. Also, the presentation information may be three-dimensional color images.

Also, in the embodiments and the like given above, an example has been described in which the information presentation device does not include an image capturing device and a presentation device, but the information presentation device may include at least one of an image capturing device and a presentation device. In this case, the image capturing device functions as an image capturer that is a part of the information presentation device, and the presentation device functions as a presenter (for example, a display or an informing unit) that is a part of the information presentation device. Also, the plurality of functional elements (the displacement detector, the matching unit, the transferer, the superimposer, and the like) included in the information presentation device may be implemented by distributed computing or cloud computing.

Also, the processing of the matching unit in the embodiments and the like given above may be performed by, for example, using a machine learning model that has been trained in advance. For example, a machine learning model that has been trained using trained data is incorporated in the matching unit. The matching unit inputs, for example, monochrome images and color images to the machine learning model as input information, and acquires information (association information) that indicates the association relationship between the monochrome images and the color images in terms of at least one of time and position as an output. As described above, the acquiring of the association relationship between the monochrome images and the color images using image recognition by the matching unit may be performed by using a machine learning model.

Also, some or all of the structural elements of the information presentation device according to the embodiments and the like given above may be composed of a single system LSI (Large Scale Integration). For example, the information presentation device may be composed of a system LSI that includes an acquirer, a detector, a matching unit, a transferer, and a superimposer.

Also, the functional blocks shown in the block diagrams are merely examples. Accordingly, it is possible to implement a plurality of functional blocks as a single functional block, or divide a single functional block into a plurality of blocks. Alternatively, some functions may be given to other functional blocks. Also, the functions of a plurality of functional blocks that have similar functions may be processed by a single piece of hardware or software in parallel or by time division.

Also, in the embodiments and the like given above, the information presentation device is implemented by using a single device, but may be implemented by using a plurality of devices that are connected to each other.

Also, there is no particular limitation on the method of communication between devices of the information presentation system according to the embodiments and the like given above. The devices may perform wireless communication or wired communication. Alternatively, the devices may perform a combination of wireless communication and wired communication.

The system LSI is a super multifunctional LSI manufactured by integrating a plurality of structural elements on a single chip, and is specifically a computer system that includes a microprocessor, a ROM (Read Only Memory), a RAM (Random Access Memory), and the like. A computer program is stored in the RAM. The functions of the system LSI are implemented as a result of the microprocessor operating in accordance with the computer program.

A system LSI is used here, but the LSI may be called IC, LSI, super LSI, or ultra LSI according to the degree of integration. In addition, implementation of an integrated circuit is not limited to an LSI, and may be implemented by using a dedicated circuit or a general-purpose processor. It is also possible to use an FPGA (Field Programmable Gate Array) that can be programmed after LSI production or a reconfigurable processor that enables reconfiguration of the connection and setting of circuit cells in the LSI.

Furthermore, if a technique for implementing an integrated circuit that can replace LSIs appears by another technique resulting from the progress or derivation of semiconductor technology, the functional blocks may be of course integrated by using that technique. Application of biotechnology or the like is possible.

Also, an aspect of the present disclosure may be a computer program that causes a computer to execute the characteristic steps of the information presentation method. Alternatively, an aspect of the present disclosure may be a computer-readable non-transitory recording medium in which such a computer program is recorded.

In the embodiments and the like described above, the structural elements may be implemented by dedicated hardware, or may be implemented by executing a software program suitable for the structural elements. The structural elements may be implemented by a program executor such as a CPU or a processor reading a software program recorded on a recording medium such as a hard disk or a semiconductor memory and executing the software program.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is widely applicable to information presentation devices that present measurement results obtained as a result of performing measurement on captured images of a structure.

What is claimed is:

1. An information presentation method, comprising:
acquiring two or more monochrome images obtained by image-capturing a structure using a first image capturing device and one or more first color images obtained by image-capturing the structure using a second image capturing device that is different from the first image capturing device, the one or more first color images having a less amount of information than an amount of information of the two or more monochrome images;
detecting a displacement that indicates a movement of the structure based on the two or more monochrome images;
generating presentation information that includes one or more second color images that present information that indicates the displacement based on the two or more monochrome images and the one or more first color images; and outputting the presentation information, wherein, the information that indicates the displacement includes a displacement vector that indicates a positional change of the structure in the two or more monochrome images, and the second color image is a color image on which the displacement vector detected based on the two or more monochrome images is superimposed, and generated based on the one or more first color images, and wherein the generating of the presentation information includes associating the two or more monochrome images with the one or more first color images in terms of time, and associating monochrome images associated with time with first color images associated with time in terms of pixel position, the two or more monochrome images include a first monochrome image captured at a first time and a second monochrome image captured at a second time that is different from the first time, and in the associating in terms of time, among the one or more first color images, one first color image captured during a period between the first time and the second time is associated with the first monochrome image and the second monochrome image.

2. The information presentation method according to claim 1, wherein the generating of the presentation information includes:

associating the two or more monochrome images with the one or more first color images in terms of pixel position; and generating the one or more second color images by superimposing the information that indicates the displacement on the one or more first color images based on a result of association obtained in the associating.

3. The information presentation method according to claim 1, wherein the generating of the presentation information includes:

associating the two or more monochrome images with the one or more first color images in terms of pixel position;

acquiring color information based on the one or more first color images;

generating one or more third color images from the two or more monochrome images based on a result of association obtained in the associating and the color information; and generating the one or more second color images by superimposing the information that indicates the displacement on the one or more third color images.

4. The information presentation method according to claim 1, wherein the first image capturing device is a monochrome camera, and the second image capturing device is a color camera.

5. The information presentation method according to claim 1, wherein the detecting includes detecting, as the displacement that indicates the movement of the structure, a displacement due to at least one of deformation, vibrations, or strain of the structure, based on the two or more monochrome images.

6. The information presentation method according to claim 1, wherein, in the acquiring, sound information obtained when image-capturing the structure is further acquired, and in the generating of the presentation information, the presentation information that further includes the sound information is generated.

7. The information presentation method according to claim 1, wherein a period in which the two or more monochrome images are captured and a period in which the one or more first color images are captured include an identical period.

8. The information presentation method according to claim 1, wherein at least one image from among the two or more monochrome images and the one or more first color images is an image captured while a load is applied to the structure, and the structure is displaced due to at least one of deformation, vibrations, or strain of the structure.

9. The information presentation method according to claim 1, wherein the one or more first color images are images with a resolution lower than a resolution of the two or more monochrome images.

10. The information presentation method according to claim 1, wherein the one or more first color images are images with a frame rate lower than a frame rate of the two or more monochrome images.

11. The information presentation method according to claim 1, wherein the two or more monochrome images acquired in the acquiring are images obtained by performing lossless compression on the two or more monochrome images captured using the first image capturing device, and the one or more first color images acquired in the acquiring are images obtained by performing lossy compression on the one or more first color images captured using the second image capturing device.

12. The information presentation method according to claim 1, wherein the two or more monochrome images are images captured using the first image capturing device that includes a global shutter image sensor.

13. The information presentation method according to claim 1, wherein the one or more first color images are images captured using the second image capturing device that includes a rolling shutter image sensor.

14. An information presentation method, comprising:

acquiring two or more monochrome images obtained by image-capturing a structure using a first image capturing device and one or more first color images obtained by image capturing the structure using a second image capturing device that is different from the first image capturing device, the one or more first color images having a less amount of information than an amount of information of the two or more monochrome images;

detecting a displacement that indicates a movement of the structure based on the two or more monochrome images;

generating presentation information that includes one or more second color images that present information that indicates the displacement based on the two or more monochrome images and the one or more first color images; and outputting the presentation information, wherein, the information that indicates the displacement includes a displacement vector that indicates a positional change of the structure in the two or more monochrome images, the second color image is a color image on which the displacement vector detected based on the two or more monochrome images is superimposed, and generated based on the one or more first color images, the generating of the presentation information includes:
associating the two or more monochrome images with the one or more first color images in terms of pixel position; and
generating the one or more second color images by superimposing the information that indicates the displacement on the one or more first color images based on a result of association obtained in the associating, the two or more monochrome images include a first monochrome image and a second monochrome image captured at mutually different times, the detecting includes detecting a first displacement based on the first monochrome image and a second displacement based on the second monochrome image, and in the generating of the one or more second color images, the one or more second color images are generated by superimposing, on the one or more first color images, an average displacement obtained by averaging the first displacement and the second displacement.

15. An information presentation method, comprising:

acquiring two or more monochrome images obtained by image-capturing a structure using a first image capturing device and one or more first color images obtained by image capturing the structure using a second image capturing device that is different from the first image capturing device, the one or more first color images having a less amount of information than an amount of information of the two or more monochrome images;

detecting a displacement that indicates a movement of the structure based on the two or more monochrome images;

generating presentation information that includes one or more second color images that present information that indicates the displacement based on the two or more monochrome images and the one or more first color images; and outputting the presentation information, wherein, the information that indicates the displacement includes a displacement vector that indicates a positional change of the structure in the two or more monochrome images, the second color image is a color image on which the displacement vector detected based on the two or more monochrome images is superimposed generated based on the one or more first color images, in the acquiring, sound information obtained when image-capturing the structure is further acquired, in the generating of the presentation information, the presentation information that further includes the sound information is generated, and the sound information includes a sound obtained when a moving object moves on the structure.

* * * * *